Patented Nov. 13, 1951

2,574,466

UNITED STATES PATENT OFFICE 2,574,466

SMOKE AGENT

John P. Clay and Hervey B. Elkins, United States Army, assignors to the United States of America as represented by the Secretary of War No Drawing. Application November 7, 1944, Serial No. 562,328

1 Claim. (Cl. 252—305)

(Granted under the act of March 3, 1883, as amended April 30, 1928; 370 O. G. 757)

The invention described herein may be manufactured and used by or for the Government, for governmental purposes, without the payment to us of any royalty thereon.

This invention relates to a chemical agent filling for munitions and a process for preparing the agent. More particularly, this invention is concerned with a new smoke agent formulated principally with red phosphorus and with a plasticizer.

It has been recognized that by far the most efficient material used in warfare for generating artificial smoke is white phosphorus. Phosphorus exists in two allotropic forms: white phosphorus and red phosphorus. White phosphorus, the normal and common form, is a waxy white solid that is spontaneously inflammable at ordinary temperatures and burns with formation of a dense white smoke of highest obscuring power. Red phosphorus is produced by heating white phosphorus to a temperature of about 250–300° C. out of contact with air. Red phosphorus is a reddish brown amorphous powder which is much less chemically active than white phosphorus. In contact with air at ordinary temperatures, red phosphorus remains unchanged for a long time; it does not dissolve in ordinary solvents for white phosphorus; it does not become luminous; and can be heated to 260° C. before it ignites. Red phosphorus vapors are not toxic as are the vapors of white phosphorus. Despite a number of advantages to be gained by using red phosphorus instead of white phosphorus in smoke munitions it was hitherto found impractical to use red phosphorus, although many years ago some attempts were made to use red phosphorus mixed with white phosphorus for generating smoke.

While white phosphorus acts efficiently in many munitions, it is still subject to several drawbacks. Its storage and handling are difficult and require special equipment, due to its spontaneous inflammability. Its melting point is below temperatures frequently reached in storage, and above this temperature many compositions of white phosphorus are unstable, the white phosphorus separating from other ingredients which under normal conditions are compatible. The requirement of thermal stability limits the preparation of white phosphorus compositions with other ingredients to a narrow range of mixtures, with the result that burning and fragmentation characteristics of white phosphorus composition can not be suitably adjusted for all circumstances. In addition, white phosphorus munitions have certain limitations on their uses. White phosphorus produces a bright flame when burning; it leaves on wet terrain unburned residues which ignite spontaneously when uncovered or dry to form a hazard to friendly troops entering the area.

Accordingly, one of the main objects of this invention is to provide a red phosphorus containing agent comparable in smoke producing efficiency to white phosphorus or compositions containing white phosphorus.

The further object of this invention is to provide a red phosphorus containing a smoke mixture highly suitable as a filling for various munitions such as bombs, grenades, rockets, and the like.

A further object is to provide a red phosphorus smoke agent filling capable of being readily ignited by standardized fuzings and of producing an effective smoke cloud of long duration with a minimum of pillaring.

An additional object of this invention is to provide a plastic red phosphorus smoke agent which is stable over a wide range of temperatures, easily prepared, and readily loaded into standardized chemical munitions.

A still further object is to provide a red phosphorus smoke agent which has a number of tactical and training uses for which white phosphorus is not suitable.

Further and additional objects will appear from the following description and appended claim.

In accordance with this invention, an improved red phosphorus containing smoke agent useful as a munition filling is provided by mixing red phosphorus with a plasticizer, preferably with a plasticizer and a volatile, flammable liquid that is compatible with the plasticizer employed.

A wide variety of plasticizers can be used with red phosphorus such as natural rubber, synthetic rubber or elastomers, acrylate polymers, aluminum soaps of high molecular weight fatty acids, and, in general, high molecular weight organic polymers and organic materials which thicken or gel flammable organic liquids when added thereto in minor proportions.

Preferably, the plasticized red phosphorus mixture comprises a major proportion of red phosphorus and a minor proportion of the plasticizer, these ingredients being thoroughly incorporated, one with the other, to produce a relatively stiff, doughy, or jelly-like mass which may be readily introduced into ordinary phosphorus munitions such as bombs, shells, grenades, rockets, and the like.

In order that the rubber or other plastic material may be readily incorporated with the red phosphorus powder it is preferable to use a suitable solvent or liquid swelling agent for the plastic material, as for example, xylene, toluene, benzene, or ethylacetate with rubber. In general, hydrocarbon solvents, such as, xylene or naphtha, are preferred with the various plastics; and, in general, about 20 to 30% by weight of a solvent is used with about 2 to 6% of the plastic.

The resulting plasticized composition when properly mixed is stable and does not tend to separate over a wide range of temperatures. The consistency of the filling composition is readily controlled by proper selection of the kind and amount of plasticizer. The burning rate of the mixture may likewise be controlled, the burning rate being slower generally with the use of more plasticizer. Also the consistency and burning rate may be varied by the addition of various oxidizing agents, reducing agents, and inert materials. For example, oxidizing agents, such as, sodium nitrate, potassium nitrate, or barium nitrate, may be added to support combustion. Inert materials, such as, asbestos fibers, wood fibers, carbon, cotton waste, or other particulate material, may be added to change the consistency and decrease the burning rate. Finely divided pyrophoric metal and other combustion substances, such as asphalt, may be added to change burning characteristics.

No special equipment is necessary for proper mixing of the ingredients.

As an illustration of one embodiment of the invention and of the simplicity in preparing the plasticized red phosphorus agent, a solution of isobutylmethacrylate in gasoline was mixed with red phosphorus powder simply by stirring these ingredients with a spatula in an open vessel. The resulting mixture was readily ignited with a match and produced a good screening smoke.

Another example of a satisfactory plastic filling prepared simply by mixing the ingredients is a mixture containing 75% red phosphorus, 2½% rubber and 22½% gasoline.

Mixtures which have been tested most widely contained synthetic rubber, particularly butadiene styrene copolymer rubber, known commonly as Buna-S, in a weight proportion of about 2–6% with about 20 to 30% gasoline and about 70 to 75% red phosphorus. Tests were carried out by exploding these mixtures in munitions such as a grenade and a standardized 100 pound chemical bomb (M47). Bombs filled with the thus prepared plasticized red phosphorus agent were dropped from an airplane and the effects were compared with the effects of 100 lb. bombs filled with white phosphorus and plasticized white phosphorus compositions. It was judged that the plasticized red phosphorus agent generated a superior screening smoke which lasted for a longer period than that generated by the other agents. The smoke from the plasticized red phosphorus agent did not pillar, whereas the white phosphorus filling in the burster type bomb pillared badly.

Also, mixtures of red phosphorus with other plasticizing agents and solvents were prepared and tested in various munitions with satisfactory results, the most satisfactory smoke being obtained when the mixtures comprised predominantly, i. e., more than 50% by weight, of red phosphorus.

In plasticizing red phosphorus, a number of flammable solvents or liquids may be used which can not be used suitably with white phosphorus. In addition to solvents which have been described, such liquids as acetone, ethyl acetate, carbon disulfide, and the like may be employed with appropriate plastics, thickeners, or gelling agents, preferably organic plastics of high heating value.

Red phosphorus is practically non-poisonous and can be safely handled. Plasticized red phosphorus mixtures containing no white phosphorus are also safe to handle, being stable and not being spontaneously inflammable. No special precaution nor special skill is necessary in preparing the plasticized red phosphorus mixtures.

Plasticized red phosphorus similar in jelly-like consistency to gelled gasoline can be used in munitions designed for such incendiary material with the same type of ignition mechanism, as for example, tail ejection bombs, burster type bombs, and grenades.

On account of the simplicity with which the plasticized red phosphorus mixtures can be prepared, they may be prepared advantageously in the field. Although an effective smoke agent may be prepared also by mixing white phosphorus with red phosphorus and a plasticizer, there are certain difficulties in making this mixture due to the spontaneous inflammability of white phosphorus and also the difficulty of mixing white and red phosphorus under water, since red phosphorus is dispersed readily in water employed in preparing the mixture.

There are additional advantages in the uses of the plasticized red phosphorus filling over white phosphorus fillings, as for example, in munitions difficult to make safe when filled with white phosphorus in any form, in tail ejection munitions which require a filling which has suitable consistency, and in large burster type munitions.

It will be apparent that the use of red phosphorus in a smoke agent comparable in effectiveness to white phosphorus is highly beneficial and remarkable considering the many difficulties in handling and use of white phosphorus and the futile efforts over many years to establish the use or red phosphorus in a smoke agent.

It is to be understood that other modifications in the preparation, composition, and use of the plasticized red phosphorus agent may be made without departing from the spirit and scope of the invention. Accordingly, it is intended that this invention be limited only by the scope of the appended claim.

We claim:

A plasticized red phosphorus smoke agent comprising about 70 to 75% by weight of red phosphorus, about 2 to 6% by weight of rubber, and about 20 to 30% by weight of gasoline.

JOHN P. CLAY.
HERVEY B. ELKINS.

REFERENCES CITED

The following references are of record in the file of this patent:

UNITED STATES PATENTS

| Number | Name | Date |
|---|---|---|
| 1,329,443 | Thomas | Feb. 3, 1920 |
| 1,863,517 | White | June 14, 1932 |
| 2,149,694 | Vollrath | Mar. 7, 1939 |

FOREIGN PATENTS

| Number | Country | Date |
|---|---|---|
| 7,314 | Great Britain | 1915 |
| 269,979 | Great Britain | Apr. 27, 1927 |

OTHER REFERENCES

Fire From the Air, Zanetti, Columbia Univ. Press, N. Y. (1942), pp. 18–24.

Chemical Formulary, Bennett, vol. 5 (1941), p. 604.